(12) United States Patent
Altinel et al.

(10) Patent No.: US 7,395,258 B2
(45) Date of Patent: Jul. 1, 2008

(54) SYSTEM AND METHOD FOR ADAPTIVE DATABASE CACHING

(75) Inventors: Mehmet Altinel, San Jose, CA (US); Christof Bornhoevd, San Francisco, CA (US); Chandrasekaran Mohan, San Jose, CA (US); Mir Hamid Pirahesh, San Jose, CA (US); Berthold Reinwald, Los Gatos, CA (US); Saileshwar Krishnamurthy, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 10/902,583

(22) Filed: Jul. 30, 2004

(65) Prior Publication Data

US 2006/0026154 A1    Feb. 2, 2006

(51) Int. Cl.
*G06F 17/30* (2006.01)
(52) U.S. Cl. .......................................... 707/3
(58) Field of Classification Search ............... 707/1–10, 707/100–104.1, 200–206; 709/248
See application file for complete search history.

(56) References Cited

U.S. PATENT DOCUMENTS

| | | | | |
|---|---|---|---|---|
| 6,122,636 | A | 9/2000 | Malloy et al. | 707/102 |
| 6,205,447 | B1 | 3/2001 | Malloy | 707/102 |
| 6,493,718 | B1 | 12/2002 | Petculescu et al. | 707/102 |
| 6,598,058 | B2 | 7/2003 | Bird et al. | 707/201 |
| 2002/0091712 | A1 | 7/2002 | Martin et al. | 707/200 |
| 2003/0195941 | A1 | 10/2003 | Amiri et al. | 709/214 |
| 2003/0208505 | A1 | 11/2003 | Mullins et al. | 707/102 |
| 2003/0208510 | A1 | 11/2003 | Doyle et al. | 707/200 |
| 2004/0153576 | A1* | 8/2004 | Hansmann et al. | 709/248 |
| 2005/0256834 | A1* | 11/2005 | Millington et al. | 707/1 |

OTHER PUBLICATIONS

Qiong Luo et al., "Middle-tier database cache for e-business", 2002, ACM Press, NY, NY, pp. 600-611.*

"Adaptive, Fine-Grained Sharing in a Client-Server OODBMS: A Callback-Based Approach;" Zaharioudakis et al.; *ACM Transactions on Database Systems*; vol. 22, No. 4; Dec. 1997; pp. 570-627.

(Continued)

*Primary Examiner*—Diane D Mizrahi
(74) *Attorney, Agent, or Firm*—IP Authority, LLC; Ramraj Soundararajan; Van Nguy

(57) ABSTRACT

A local database cache enabling persistent, adaptive caching of either full or partial content of a remote database is provided. Content of tables comprising a local cache database is defined on per-table basis. A table is either: defined declaratively and populated in advance of query execution, or is determined dynamically and asynchronously populated on-demand during query execution. Based on a user input query originally issued against a remote DBMS and referential cache constraints between tables in a local database cache, a Janus query plan, comprising local, remote, and probe query portions is determined. A probe query portion of a Janus query plan is executed to determine whether up-to-date results can be delivered by the execution of a local query portion against a local database cache, or whether it is necessary to retrieve results from a remote database by executing a remote query portion of Janus query plan.

25 Claims, 9 Drawing Sheets

OTHER PUBLICATIONS

"An Adaptive Peer-to-Peer Network for Distributed Caching of OLAP Results;" Kalnis et al.; *ACM SIGMOD*; Jun. 2002; pp. 25-36.

"Dynamic Adaptive File Management in a Local Area Network;" Yang et al.; *20th International Conference on Distributed Computing Systems (ICDCS)*; IEEE Proceedings; Apr. 2000.

"An Effective Wrapper Architecture to Heterogeneous Data Source;" Wang et al.; *Proceedings of the 17th International Conference on Advanced Information Networking and Applications (AINA)*; Mar. 2003; pp. 1-4.

"A Highly Configurable and Adaptable Process Scheduler;" Shaffer et al.; *IBM Technical Disclosure Bulletin*; Apr. 2001; p. 630.

"MODEC: a Multi-Granularity Mobile Object-Oriented Database Caching Mechanism, Prototype and Performance;" Chan et al.; *Distributed and Parallel Databases*; vol. 7, No. 3; Jul. 1999; pp. 343-372.

"On Adaptive Caching in Mobile Databases;" Leong et al.; *Proceedings of the 1997 ACM Symposium on Applied Computing*; 1997; pp. 302-309.

\* cited by examiner

```
INSERT INTO UserSchema. Customer
SELECT * FROM NN. Customer
WHERE custType = "gold"

INSERT INTO UserSchema. Order
SELECT * FROM NN. Order
WHERE cid IN (SELECT cid FROM NN. Customer
              WHERE custType = "gold")
   AND (oid) NOT IN (SELECT oid FROM
UserSchema.Order)

INSERT INTO UserSchema. Orderline
SELECT * FROM NN. Orderline
WHERE oid IN (SELECT oid FROM NN. Order
              WHERE cid IN.
                   (SELECT cid FROM NN. Customer
                    WHERE custType = "gold"))
   AND (olid) NOT IN (SELECT olid FROM
                      UserSchema. Holding)
```

Fig. 8

SYSTEM AND METHOD FOR ADAPTIVE DATABASE CACHING

BACKGROUND OF THE INVENTION

1. Field of Invention

The present invention relates generally to the field of database caching. More specifically, the present invention is related to local cache consistency maintenance with respect to one or more backend databases.

2. Discussion of Prior Art

Transactional Web Applications (TWAs) have recently reached widespread use in modern enterprise application infrastructures. Such applications are typically implemented within a broad range of technologies including network load balancers, HTTP servers, application servers, transaction-processing monitors, and databases. In its simplest form, a TWA is associated with an HTTP server hosting presentation logic, and with an application server hosting business logic (e.g., Java servlets or EJBs). A TWA is provided with data obtained from queries, issued by an application server, to a relational database. FIG. 1 depicts a prior art example of an enterprise application configuration.

Typical TWA operations include browsing a product catalog, populating a shopping cart or a wish list, placing the order, and checking order status. Requests from TWAs go through several layers of computer systems as shown in FIG. 1. Caching can occur at different granularity at each layer. For example, HTML pages can be cached at proxy servers inside the Internet, or at reverse proxy servers within the enterprise infrastructure. Web servers can cache fragments of HTML pages, and application servers can cache business objects, all of which lead to an increase in the performance of TWAs at different levels.

Caching static HTML pages and data as a technique to achieve better scalability and faster response time of interactive TWAs has long since been popular. Caching takes place in various forms: a cache for a client browser, forward and reverse proxy caches, nodes of content-delivery overlay networks, and in specialized object caches associated with application business logic. Combining caching technologies at various levels in an application infrastructure stack often adversely affects response time and scalability. However, as web pages become more dynamic and equipped with increased personalization capabilities, such static HTML caching techniques become less useful in supporting the delivery of high volumes of frequently updated information. High-volume web sites often serve highly personalized content to their users.

As a consequence, reusability of generated web pages is low, and data needed to build a web page often cannot be profitably cached far away from those enterprise application servers housing business logic that manipulates such data. For this reason, some enterprise applications run their business logic on application server nodes deployed in remote data centers that are proximate to users (e.g., web-hosting services). Partnerships between content-delivery network service providers (e.g., Akamai Technologies Incorporated) and application server vendors (e.g., IBM Corporation and BEA Systems Incorporated) facilitate the transfer of content and applications from origin enterprise servers, thereby improving response times and reducing the load on local, in-house systems. These approaches, however, are limited in their provision of access from remote application servers to central backend databases on origin enterprise servers.

Addressing this limitation is a promising technique capable of handling the dynamic nature of TWAs: database caching. Data stored in a database cache is obtained by a remote application server via database queries in the same manner as would be obtained by direct, backend database access.

There are a number of different options addressing a database cache entity implementation; semantic caching as disclosed by Dar et al. in the non-patent literature entitled "Semantic Data Caching and Replacement" and DBProxy as disclosed by Amiri et al. in the non-patent literature entitled "DBProxy: A Dynamic Data Cache for Web Applications" are two of such implementations. In these implementations, query results are locally stored in a cache; this cache is consulted for each new query to determine whether a result can be produced solely from local data. By contrast, other caching approaches describe systems in which a full-fledged database server is collocated with an application server.

One advantage of the latter approach is that a significant portion of query parsing and analysis logic that already exists in a full-fledged database system can be exploited to manage a cache. Such an approach also enables caching of other associated database objects, such as triggers, constraints, indices, and stored procedures. In this manner, application performance and semantics are provided along with uninterrupted service when backend databases are unavailable.

A simple approach to implementing a database cache would be to replicate full content of selected tables from a backend database. In this case, each cache table referred to in a query can be used as long as stale data is acceptable. However, front-end systems are much less powerful than backend systems thus making full-table caching more difficult. Even for a powerful front-end system, large table sizes can easily make full-table caching infeasible because of increased replication and maintenance costs in a database cache. Deepening this approach, sub-table caching provides an effective alternative by caching only selected parts of backend database tables. Materialized view mechanisms in current database products can be exploited for this purpose. Materialized views are developed to store pre-computed query results that are later used to improve performance and speed data access of expensive queries.

Nicknames in DB2™ are references to remote tables that can be used in federated queries. In order to implement a sub-table cache, in particular by creating materialized views based on nicknames, extra processing effort is not required. This way, existing materialized view-matching mechanisms in DB2™ can be exploited to route queries to either cached tables, by materialized views, or to backend tables, by nicknames depending on query predicates. However, in a database cache, this approach is limited in that materialized views require declarative specification. Once specified, the definition of materialized view content cannot change dynamically based on demand. Unfortunately, it is difficult, if at all possible, to know a priori exactly what to cache because of the dynamic nature of web applications (e.g., caching the content of a shopping cart in a typical e-commerce application).

As described in the product documentation entitled "Oracle Internet Application Server Documentation Library," by Oracle Corporation, and the non-patent literature entitled "Mid-tier Caching: The FrontTier Approach," by The TimesTen Team, Oracle™ and TimesTen offer database cache products of interest. The Oracle™ approach involves full-table caching using a full-fledged database server at a middle tier between remote data centers and a central backend database, in which updates are propagated through replication. Their solution ensures that other database objects, including stored procedures and user-defined functions, are deployed in the middle-tier, from a central backend database, as well.

Although this approach has the advantage of considerable application transparency, it requires considerable cache population and management tasks for large tables. On the other hand, the TimesTen Front-Tier approach allows subtable level caching and local updates at cache databases. However, an application utilizing such a cache needs to be made aware of the freshness of cache content and choose a target database (i.e., cache or backend) accordingly. Moreover, the TimesTen Front-Tier approach is restricted to work only with an Oracle™ backend database. A cache group first introduced by The TimesTen team is defined solely based on referential integrity constraints of a backend database and is therefore less restrictive.

Whatever the precise merits, features, and advantages of the above cited references, none of them achieves or fulfills the purposes of the present invention.

SUMMARY OF THE INVENTION

The system and method of the present invention provides for transparent, adaptive caching functionality via cache tables defined by a database cache model and via two-headed query plans. A cache table is a database object by which an end user specifies a table in a cache database as being a cache of a remote table in a separate, remote backend database. Each cache table is associated with a nickname that represents the corresponding backend table. From the application viewpoint, cache tables are semantically equivalent (i.e., peer-level objects) to the associated backend tables. For this purpose, semantically importance database objects, such as constraints and triggers, are also cached as well. A database cache model specifies a caching scheme that harnesses the distributed query processing power of, for example, DB2™ to build an adaptive database cache. In one embodiment, such a scheme dynamically populates a cache table by exploiting frequently-occurring characteristics of typical transactional web applications (TWAs). Typical TWAs have characteristics comprising: a relatively high volume of short transactions, simple equality predicates, and multiply joined queries (e.g., 3-way, 4-way). The application of caching to TWAs is not restrictive; caching may be applied to any type of database application. In another embodiment, a declarative population method is specified by a database cache model. As a result, a cache table is formed in such a manner that provides a database cache instance with the ability to adapt to an application's changing workloads. In yet another embodiment, a database query optimizer does this by generating dynamic query plans, formed from one or more parts of an original database query, against either a local database cache or a remote backend database server.

If existing content in a database cache table is insufficient to fully provide results for a query, the query is transparently routed to and executed against an appropriate backend database table using an associated nickname. To achieve transparent deployment of a database cache, it is not necessary to make changes to the database schema as viewed by the applications. Each backend database table is represented locally in a cache database schema either by a local cache table or by a nickname referring to a specific backend database table, depending on whether caching is enabled for a particular backend database table. Although query compilation and maintenance mechanisms differ depending on the type of cache table, a combination of declarative and dynamic settings is possible in one cache database embodiment.

A two-headed query plan is comprised of a probe portion, a local query portion, and a remote query portion. During run-time execution, database conditions are initially examined with respect to a set of cache constraints using a probe portion in order to guarantee the "correctness" of query results. While a remote query portion is constructed solely of nicknames for remote backend database tables, a local query may be comprised of nicknames and local cache tables such that query partitioning is enabled. Depending on the degree of rigor imposed by a query constraint, a local query is distributed amongst both a local cache and a remote database by a query.

BRIEF DESCRIPTION OF THE DRAWINGS

FIG. 8 illustrates exemplary insert statements for insertion to a cache database of the present invention.

DESCRIPTION OF THE PREFERRED EMBODIMENTS

Figure 1:
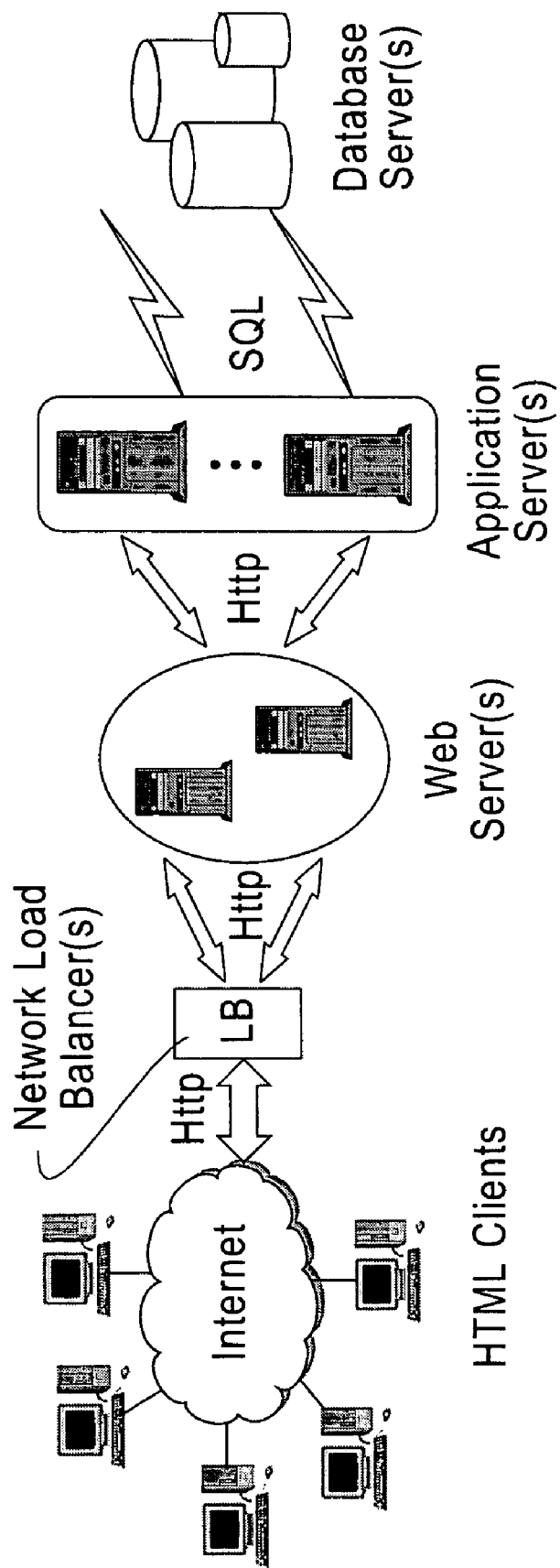
FIG. 1 illustrates a typical multi-level application enterprise architecture of prior art.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
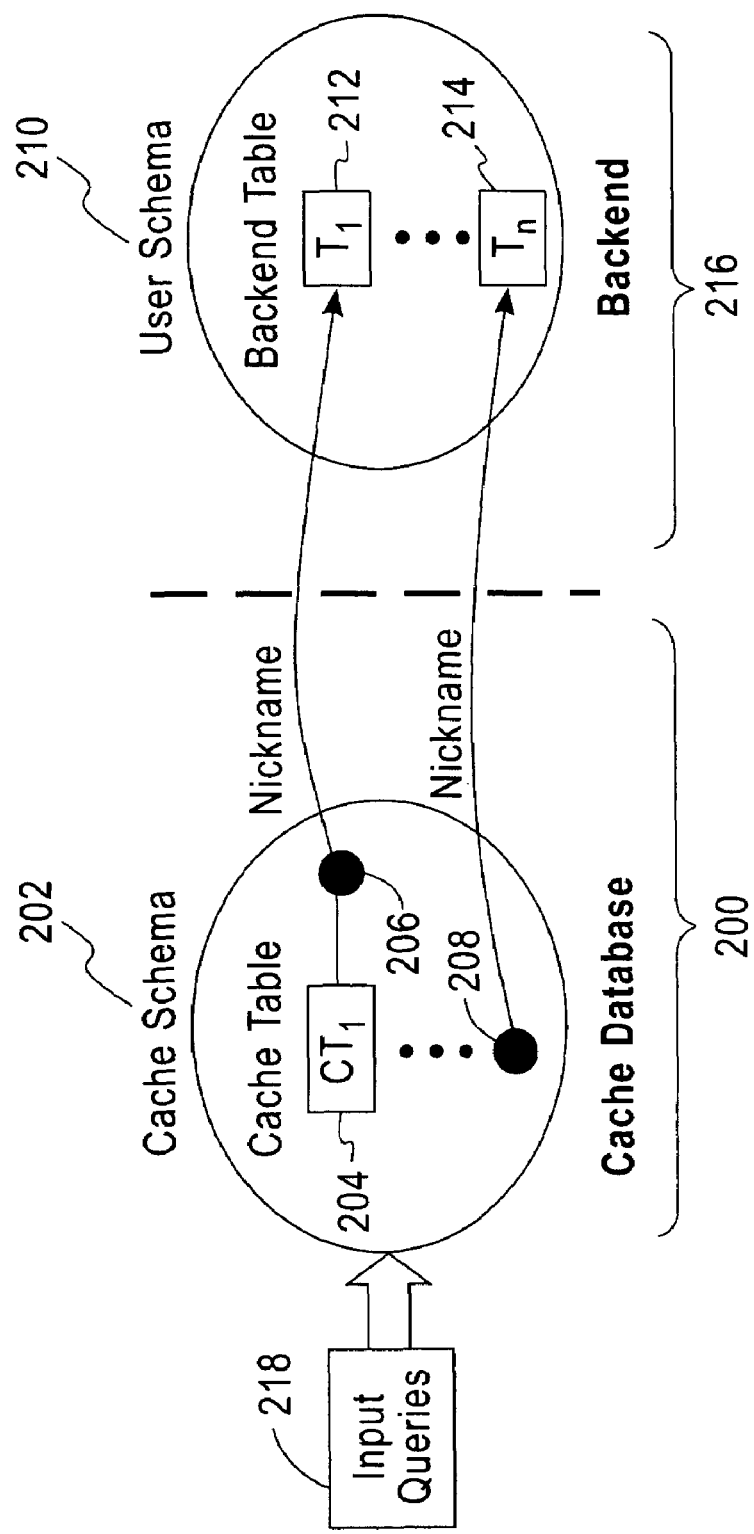
FIG. 2 illustrates a dynamic cache database system diagram of the present invention.

Referring now to FIG. 2, a schema setup diagram of the present invention is shown. Cache schema 202 elements are created and named to mirror backend tables 212, 214 in a user schema of a backend database. Additionally, columns in cache table 204 elements are identical in number and type as columns in counterpart backend tables 212. As a result, cache schema 202 in a cache database 200 replicates corresponding user schema 210 in backend database 216 and does not require modification to existing application queries 218. Dynamic cache tables 204 are populated from a backend table on demand as dictated by application-issued queries. A dynamic cache table 204 is created and associated on demand, with a backend table 212 through a nickname 206 that refers to a particular backend table. In FIG. 2, nickname 208 refers to backend table 214.

Figure 3:
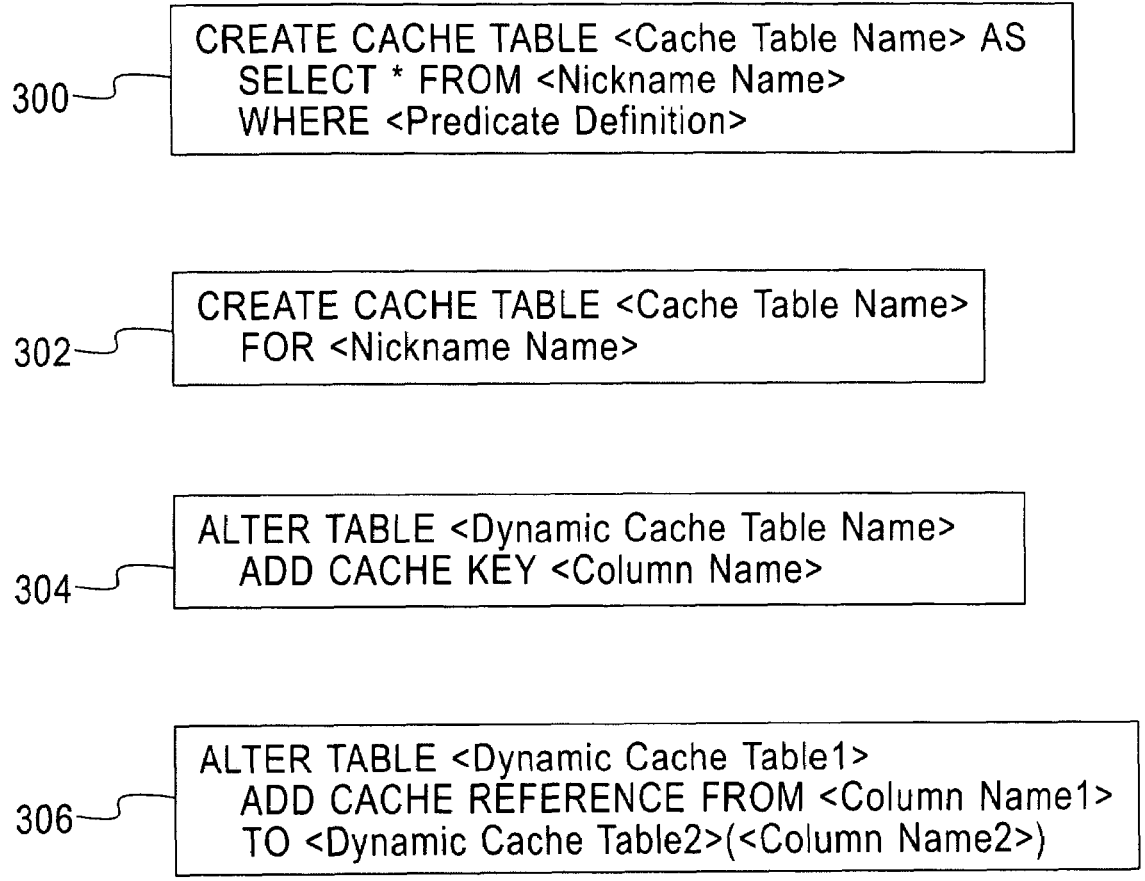
FIG. 3 represents exemplary declaration statements for the creation and maintenance of a cache database of the present invention.

In contrast, declarative cache tables are primarily used when desired portions of cache table content are known in advance, is created with a declarative cache table creation template statement 300, as shown in FIG. 3, with a predicate specifying a row subset to for caching. If a predicate is not specified, the entire table from a backend database is cached.

Also shown in FIG. 3 is a template used to create a dynamic cache table 302. A declarative cache table is also enabled to refer to a backend table via nickname.

Cache Constraints

Population methods and content contained within a dynamic cache table are described by cache constraints. By observing cache constraints, a correctness property is guaranteed; executing a query against dynamic cache tables obtains the same results as if executed against a backend database at some previous point of time. Cache constraints assist in the determination of a valid set of dynamic cache tables, wherein each member of the set maintains a correctness principle and is eligible for reference by an application-issued query. By observing cache constraints, a correctness property guarantees that the result of a query obtained by using dynamic cache tables is the same as the result of the query if it were to be executed at the backend database, modulo the differences due to the cached database being out-of-date. Types of cache constraints enforced for dynamic cache tables are comprised of cache key constraints defined for specified columns of a cache table and of referential cache constraints involving multiple cache tables.

A cache key is defined as a cache table column whose values identify records contained in a given cache table. A cache key is necessarily domain complete, which guarantees that a cache table contains all the rows from the backend table that contain a particular value. Of notable interest, unique cache table columns and hence, primary key columns as well, are domain complete by definition. If a cache key is defined for a non-unique column, the database caching system and method of the present invention (DBCache) satisfies domain completeness for that column by fetching and loading into a cache table, necessary backend records. For a single cache table $CT_i$, domain completeness guarantees the correctness of equality predicates of the form of "$CT_i.c_x$=value", where $c_x$ is a domain-complete column. If such is the case, $CT_i$ is deemed an eligible table for a local query. Using the domain completeness property, a set of eligible cache tables comprising single table equality predicates is determined for reference by local queries. Explicitly defined cache keys indicate an intention of triggering on-demand loading for missing cache key values. Shown in FIG. 3 is a DDL template to create a cache key for a dynamic cache table 304.

Referential cache constraints (RCC) are specified to guarantee the correctness of join operations between cache tables. DBCache makes a provision for maintaining consistent copies of correlated values in a cache table. An RCC, defined for any pair of columns from distinct cache tables between which it is possible to apply a join operation, creates a cache-parent/cache-child relationship between two cache tables. An RCC between a column $c_n$ of a cache table $CT_i$ (cache-parent) and column $c_m$ of another cache table $CT_j$ (cache-child) is an indication that any value of $c_n$ in $CT_i$ is associated with all rows having the same value in $c_m$ of $CT_j$. Given an example in which an equi-join predicate is specified such that "$T_i.c_n=T_j.c_m$", where $T_i$, $T_j$ are backend tables corresponding to cache tables $CT_i$, $CT_j$, respectively, and $CT_i$ is the cache-parent of $CT_j$ via columns $c_n$ and $c_m$; if cache-parent $CT_i$ is eligible for use in a local query plan, cache-child $CT_j$ is eligible as well. More generally, the join operation "$CT_i.c_n=CT_j.c_m$" can be performed in the cache database. Shown in FIG. 3 is an exemplary DDL template to create RCCs in DBCache 306.

Cache Groups

DBCache identifies as a cache group, a set of related cache tables populated with values of at least one cache key of a single, distinct root cache table. Tables in a cache group that can be reached from a root table via RCC constraints are known as member tables of their cache group. If a cache table does not contain a cache key, it must be a member table of at least one cache group. In a cache database, a first cache group is a subset of a second cache group if a root table the first cache group is a member of the second cache group. Cache groups intersect if they share in common one or more member tables. Cache groups are implicitly constructed, as opposed to declaratively constructed, based on cache constraints.

A cache group is represented as a directed graph, known as cache group graph, in which nodes denote cache tables and edges denote RCCs. An edge is directed from a node representing a cache-parent table to a node representing a cache-child table. A bidirectional edge indicates the existence of two RCCs between a pair of corresponding columns, one in each direction. For each row in a cache table, there are corresponding rows in another table. A unidirectional path is one formed from a source table to a target table in the graph by following direction edges representing a set of RCCs. Each participant table is traversed at most once; however a cycle path starts and ends with the same table. Of notable interest, each bidirectional edge corresponds to a cycle. A cache group graph also corresponds to a reachability graph of a root table, in which all members of a cache group represented by nodes can be reached. Additionally, a connectivity graph captures the combined representation of overlapping cache group graphs.

Figure 4:
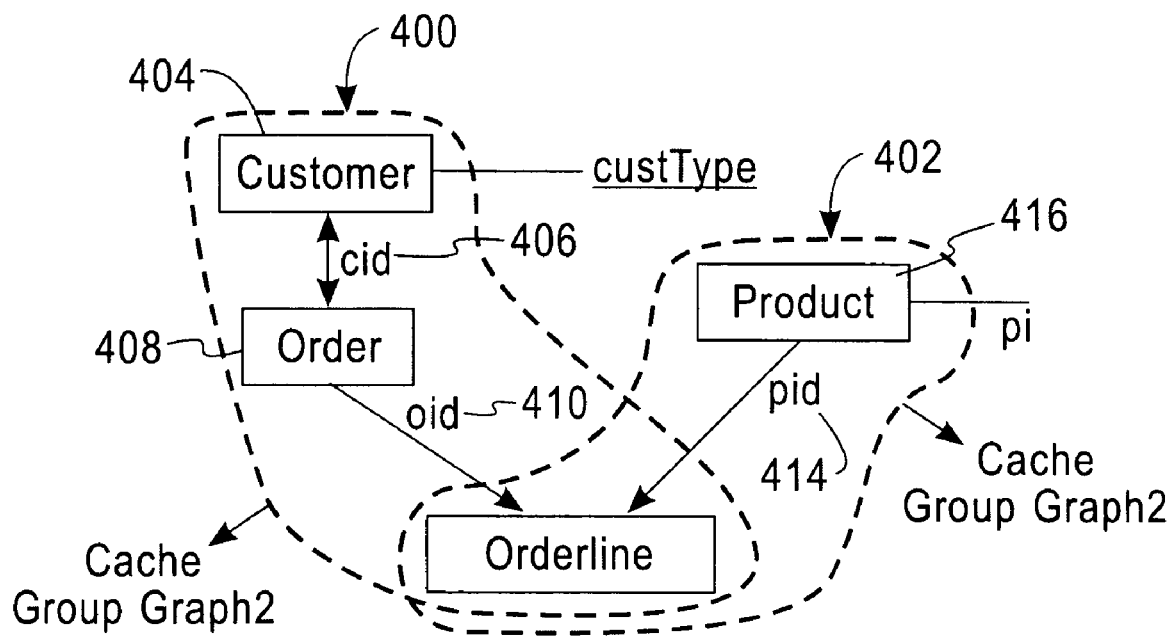
FIG. 4 illustrates an exemplary cache group connectivity graph.

FIG. 4 shows a connectivity graph which comprises overlapping cache group graphs 400, 402. Cache group 400 content is identified by customer 404 with custType cache key and cache group 402 is identified by product 416 with pid cache key of their respective root tables. For example, when a "gold" customer is cached based on the "custType=Gold" predicate, it is guaranteed that for all "gold" customers, their order 408 and orderline 412 rows will be cached, thus benefiting join queries involving these tables.

Figure 5:
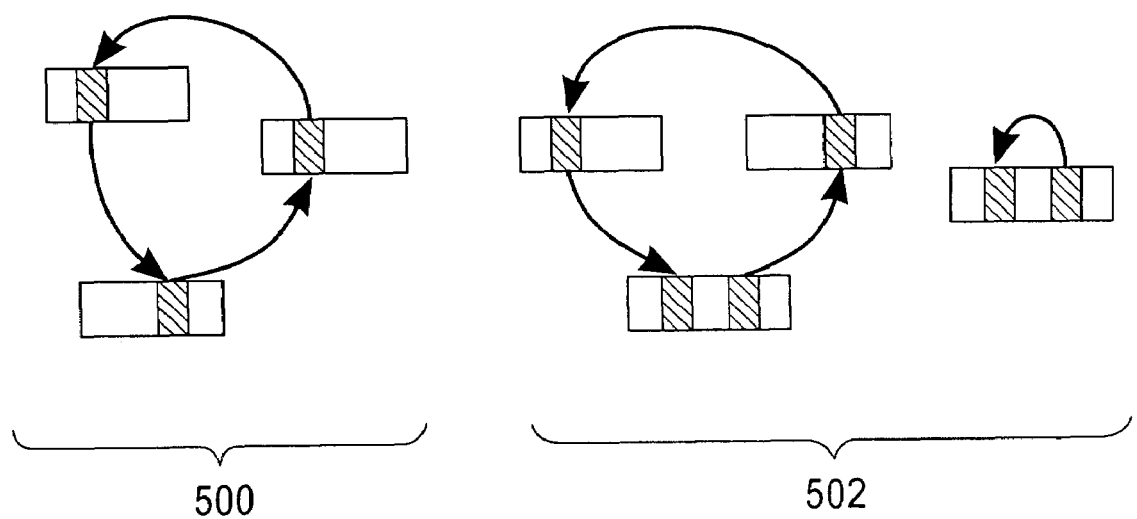
FIG. 5 illustrates homogenous and heterogeneous cycles in a cache group graph.

When a cache group graph contains a cycle, there exists the possibility of recursive cache load for each participant table. A safe condition that prevents recursive cache load for a cycle is in effect when only a single column of each participant table is touched upon once during a traversal. Such a cycle is called homogeneous cycle. Note that each bi-directional edge creates a homogeneous cycle. On the other hand, a heterogeneous cycle is formed by a path if one of the participant tables contains two or more columns used in the traversal. FIG. 5 illustrates homogenous cycle type 500 and heterogeneous cycle type 502. Heterogeneous cycles pose a potential risk of recursive cache load, and hence as a precondition, are not allowed in a cache group setting. In DBCache, a cache table is implicitly defined as domain complete if one or more of the following conditions are satisfied: (1) a given column is unique or a primary key column, a cache key is defined for a given column, (2) a given column is involved in a homogenous cycle (domain completeness for the initiating column of a cycle is enforced by the system), (3) a given column is the only column used in a set of RCCs where its cache table is participating as a cache-child, and the cache table does not contain any cache key defined on another column (aka induced domain completeness).

Referring back to the exemplary connectivity graph shown in FIG. 4, cid column 406 of table Order 408 is part of a homogeneous cycle and hence is domain complete according to previously defined conditions. For a given cache table, there is no limit on the number of domain-complete columns as long as they are unique. However, at most one non-unique column can be domain complete; thus the following are precluded from a cache group: (1) a cache table having more than one non-unique cache key, (2) a cache table having a non-unique cache key in conjunction with one or more non-unique columns being a part of a homogeneous cycle, and (3) a cache table having two or more non-unique columns which are involved in homogeneous cycles.

Query Plan Generation

Queries involving declarative cache tables are compiled using existing materialized, view-matching mechanisms. Specifically, declarative cache tables are created as materialized views over nicknames such that, during query compilation, a view-matching mechanism is able to route queries to either a local cache database or a backend database. In essence, each declarative cache table reference is replaced with its corresponding nickname in a query, such that existing view-matching mechanisms are enabled to route a given query.

Figure 6:
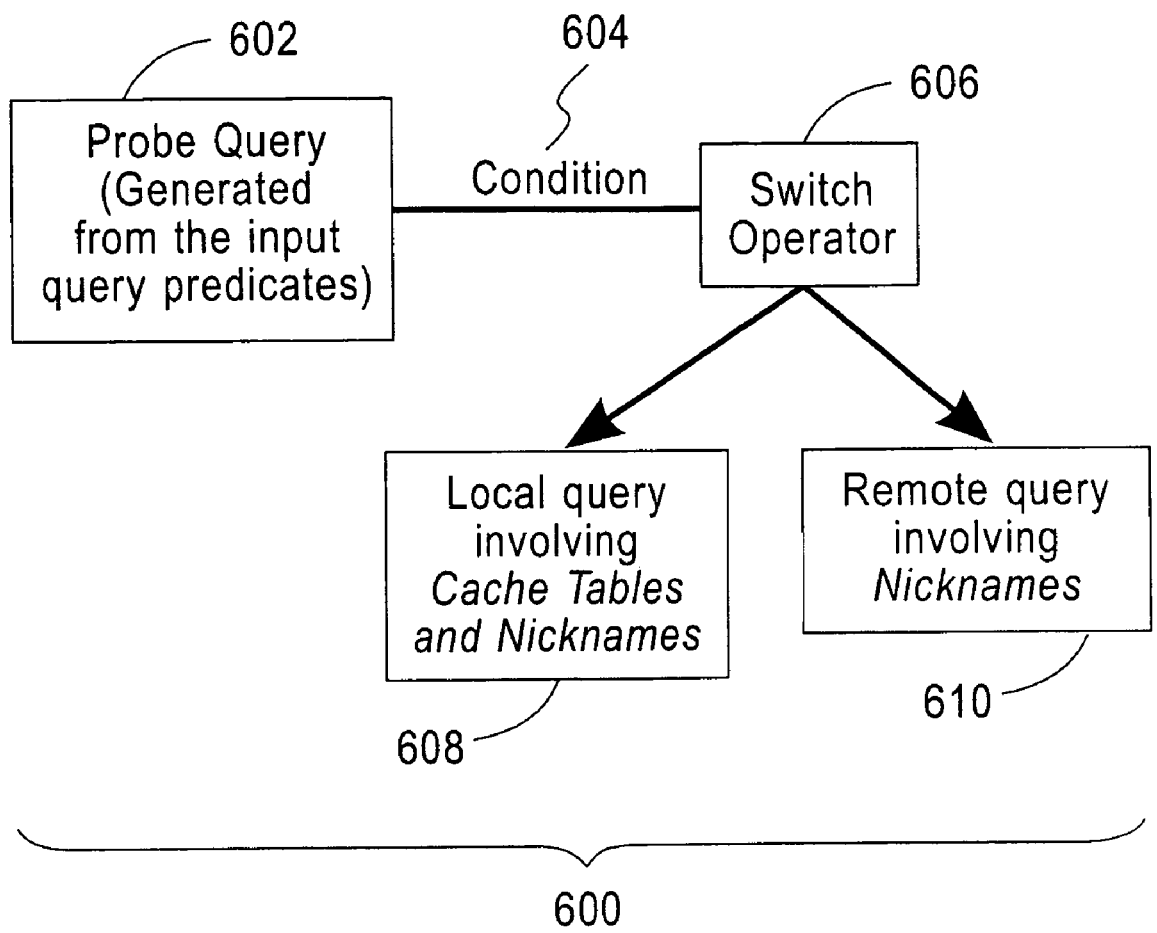
FIG. 6 illustrates components comprising a two-headed query plan.

For dynamic cache tables, two alternative query plans for each query are created during query compilation. A first plan, constructed from available dynamic cache tables and database nicknames in the query, is termed a local query plan 608. A second plan, constructed solely of database nicknames, enables remote query execution as a remote query plan 610. Both plans are tied together with a conditional switch operator 606, and are jointly known as a Janus plan 600, as shown in FIG. 6. Switch operator 606 operates on condition 604 containing a sub-query, known as a probe query 602. Probe query 602 is used to decide, during the time of execution, whether to execute a local or a remote portion of Janus plan 600, depending on resulting condition 604 of probe query 602. Probe query 602 first accesses data in a pre-computed set of cache tables to determine a cache table's availability in providing results to an input query (see Appendix A for details of computations). Thus, Janus plan 600 is provided with a mechanism for determining, at execution, whether or not local cache tables are available for use while also avoiding costly query recompilation.

A Janus plan is constructed in four steps. An initial query plan is first converted into a remote plan referencing only backend database table nicknames. Thus, a query is ensured to be executable even if a Janus plan is not created. For example, when a currency setting for a cache database indicates that dependent applications cannot tolerate out-of-date data, no attempt is made to generate a Janus plan and data is retrieved from a backend database. Subsequently, a probe query is generated by checking equality predicates in an input query to determine participation in a probe query condition (see Appendix A for details of computations). If an equality predicate does not exist for a given input query, Janus plan creation is aborted. Otherwise, an input query is cloned and clone nicknames are replaced with corresponding cache database table names. A cloned query plan becomes a local query plan and an unaltered, original query plan remains a remote query plan. Lastly, a switch operator is inserted at the top of the query plan, and local, remote, and probe query plans are tied to the switch operator.

To populate declarative cache tables initially and to keep them up-to-date later, DBCache relies on an asynchronous replication tool for relational data consisting of two separate components, the data change capture program and an apply program. Based on subscription settings, a capture program detects changes in a source database and notifies an associated apply program which in turn applies corresponding database operations to replicated data. Using predicates given during the creation of declarative cache tables, automatic replication subscriptions are configured. When capture and apply programs are started, declarative cache tables are loaded with data from counterpart tables in a backend database and are asynchronously updated at a specified frequency.

Asynchronous On-Demand Cache Loading

Figure 7:
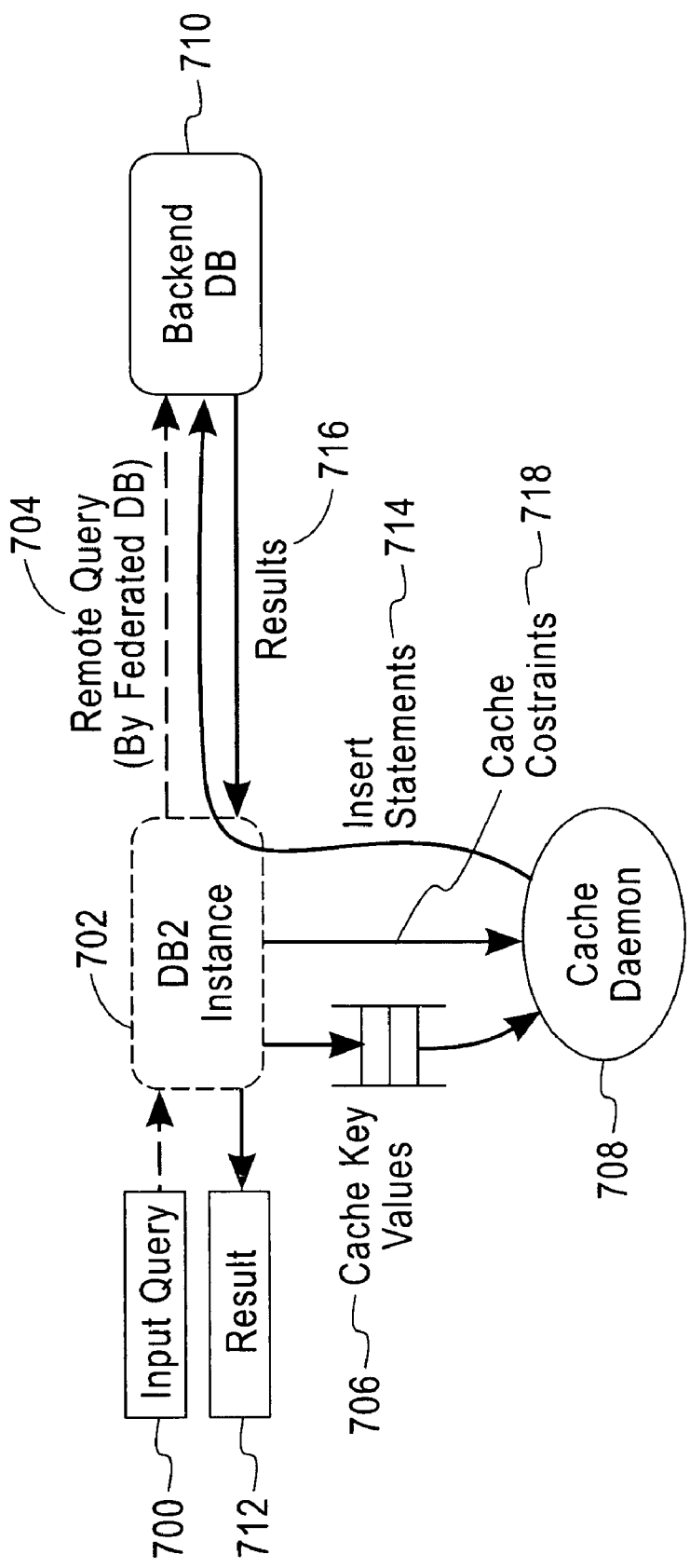
FIG. 7 is a system diagram for on-demand cache loading.

Referring now to FIG. 7, a system diagram of on-demand cache loading is shown. Each execution of a remote query 704 in Janus plan in DB2 instance 702 is considered a cache miss in DBCache. Cache key values having failed a probe query are used to perform on-demand cache loading. Actual cache population is done asynchronously, cache key values 706 associated with cache tables in DB2 instance 702 are passed to cache daemon 708. This is accomplished by sending a message from a user-defined function attached to remote query plan in DB2 instance 702. Actual query results are returned to a user application 712 via DB2 instance 702 from backend database 710. Cache daemon 708 is an external process which runs as a relatively low priority background process, checks cache constraints 714 of DB2 instance 702, and asynchronously issues insert statements against affected cache tables 716 in DB2 instance 702. Shown in FIG. 8 is an example of insert statements generated and issued by cache daemon 708.

Cache miss messages are not necessarily persistent. If a pending cache miss message is lost after a system failure, another cache miss message is simply sent for the same cache key value at the next corresponding cache miss. If a given cache miss message is sent and applied multiple times, for example because a second request for the same cache key occurred before the first cache miss was processed, a resulting primary key constraint violation will cause the process to skip the second message. To reduce the likelihood of processing multiple cache miss messages for the same cache key values, a specified number of last cache miss messages received are stored; incoming cache miss messages already in the list are discarded.

At most one insert statement per cache table in a cache group is prepared during cache population. Subsequently, insert statements are executed in a single transaction, to guarantee consistency of the affected cache tables.

Dynamic Cache Population

For each received cache key value, a set of rows necessary for insertion into a corresponding cache table $CT_0$, known as a set of qualifying rows, is determined by considering all cache keys of $CT_0$. For each defined cache key, it is necessary to guarantee domain completeness. Starting from a cache table $CT_0$, for every RCC constraint $CT_i \rightarrow CT_{i+1}$, qualifying rows for $CT_{i+1}$ are determined based on qualifying rows for $CT_i$ and cache keys defined on $CT_{i+1}$. A set of qualifying rows for $CT_{i+1}$ is the set of cache-child rows corresponding to a qualifying row set for $CT_i$ plus rows necessary to satisfy domain completeness properties, due to cache keys for $CT_{i+1}$. Recursively, for all outgoing edges from $CT_{i+1}$, qualifying rows are determined.

Qualifying rows for a cache table are represented as nested sub-queries that refer to corresponding backend tables. Thus, an insert statement for each visited cache table is a federated query and contains a select sub-query on corresponding nicknames thus enabling retrieval of qualifying rows not already existing in the cache table. Referring to connectivity graph example shown in FIG. 4, for cache key Customer.custType and value 'gold', corresponding insert statements for affected cache tables are shown in FIG. 8. Note that cache tables are named in common with corresponding tables at a backend database. Nicknames are defined in a DBCache-specific schema, in exemplary FIG. 8, this DBCache-specific schema is called NN in this example.

To process a cache population message, a cache daemon generates and executes a list of appropriate relational database statements (e.g., SQL statements). To increase performance, statement lists are generated once, and stored internally in a generated statements cache thus enabling re-usability across messages of the same type. Since statements generated by a cache daemon contain parameter markers, equivalent statements with different parameter bindings are used for an equivalent type of cache operation. For example, equivalent insert statements are used to populate the same cache group based on different cache key values. A key for a generated statements cache is based on fields determined by operation type. Database name and operation type are pieces of information common to all operation types. For cache population and garbage collection operations, a key also contains a fully qualified column name of a corresponding cache key column. For deletion, additional information comprising fully qualified names of primary key columns. Finally, for an update operation, fully qualified column names of all updated columns are additionally used in a key. The size of a generated statements cache (i.e., the maximum number of statement lists stored) can be specified individually for each type of cache population and maintenance operation.

Cache Maintenance

Figure 9:
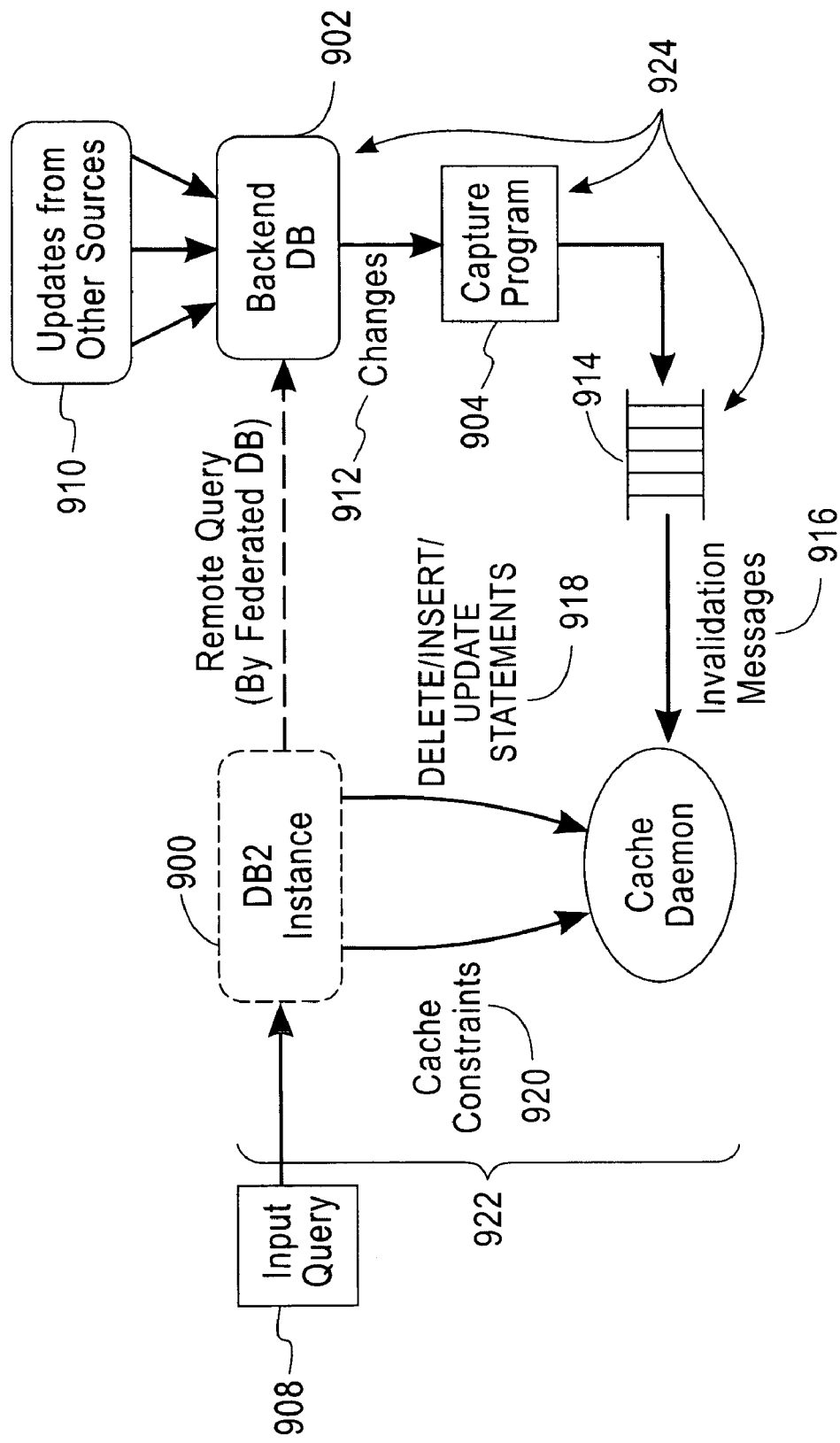
FIG. 9 illustrates cache database maintenance of the present invention.

Dynamic cache table content is updated in response to update, deletion, and insertion of represented rows at a corresponding backend database. As shown in FIG. 9, capture program 904 provides necessary facilities to access changes in rows 912 in backend database 902 and sends corresponding update messages to a cache daemon 906. Update operations 910 at backend database 902 that are not related to current cache content are filtered either at cache database node or at backend database node. In support of filtering at a cache database, capture program 904 sends update messages 916 via message queue 914 to cache daemon 906 for every update made to backend database 902. Cache daemon 906 determines which operations are to be applied to local cache database 900. Determination as to which update operations are to be applied at cache database 900 can be made at backend database node. In one embodiment, a combination of cache database and backend database filtration is specified. Upon receiving an insert, update, or delete message 916 cache daemon 906 generates appropriate insert, update, and/or delete statements 918 obeying existing cache constraints 920 and issues them against cache database 900. Local cache database node 922 is comprised of DB2 instance 900 and cache daemon 906 components, and remote backend database node 924 is comprised of backend database 902, capture program 904, and message queue 914.

A local cache database is maintained by making corresponding changes to a local cache consistent with row data insertions, updates, and deletions occurring at a remote backend database. In support of maintaining cache consistency with respect to row data insertions, a newly inserted row is imported to a local cache database if either: for any value in a target column of an RCC, a corresponding cache parent row exists in a local cache database; or if for a non-unique cache key of a target cache table, rows having the same key value exist in target cache table table.

Based on the location of update operation relevancy determination, a plurality of alternatives exist for column subscription to corresponding backend database tables. In addition to values for primary key columns, an insert message contains values for columns that are either the target of an incoming RCC or values for a non-unique cache key of a corresponding table. Having such values in an insert message allows determination at a cache database whether it is necessary to insert new row data, without the necessity of accessing a corresponding backend database. However, if new row data qualifying for insertion to a cache is missing column values, retrieval from a backend database table is necessary.

If an update occurs on columns that are neither referenced by an RCC, nor are cache key columns, it is possible to simply update a corresponding row in a cache database. Similarly, if for either of an updated RCC or cache key column, a new value exists in a cache database, the corresponding row in a local cache database is updated. However, if new values of an updated RCC or cache key column are not stored in a cache database, the corresponding row storing old values is deleted from cache database. Maintenance information sent to a cache daemon includes a primary key value as well as old and new values of updated columns for a modified row. If an update message is seen by a cache daemon before the row is imported to a cache database due to a cache miss, a corresponding update message is discarded.

In the case of a row deletion from a backend database in which the same row exists in a local database cache, a row deletion occurs from a corresponding cache table. Otherwise, a received deletion notification message is discarded. If a given deletion notification message requires the deletion of a cache child, the corresponding row is deleted from a local cache database. If a given deletion notification message requires the deletion of a cache parent, it is not necessary to delete corresponding cache children in the preservation of cache consistency. However, for every outgoing RCC pointing to a cache child table having no other cache key columns or incoming RCCs from other cache parent tables, cache children not shared by another cache parent row are deleted. The reason for this is to avoid un-reachability of cache children during garbage collection. Maintenance information sent to a cache daemon contains a primary key value for a deleted row at a backend database.

A garbage collection mechanism for a cache daemon deletes rows directly from cache tables based on cache key values, in order to delete whole cache group instances in the reclamation of cache space. A metric used to determine candidates for eviction is based on components comprising: popularity (i.e., the number of cache hits that have occurred for a particular cache group instance), recency (i.e., the length of time that a cache group instance has been in a cache database), and storage space consumption (i.e., the size of a cache group instance in terms of memory occupied). In one embodiment, different weights are applied metric components by a system or user. Differing from a row deletion based on a delete statement at a backend database, an eviction requiring the deletion of a cache parent correspondingly requires deletion of cache children as well. In specific, cache children of a give cache parent that are not referred to by the same cache parent in an RCC of another cache group, are deleted. From a cache daemon point of view, garbage collection appears as the execution of multiple delete statements within a single transaction.

The present invention provides for an instance of DB2™ is represented as a transparent database cache manager by modifying existing engine code and leveraging existing federated database functionality. Thus, database caching is supported not only at mid-level nodes of central enterprise infrastructures, but also at remote data centers and edge servers within content delivery networks. Given the potential for a large number of database cache deployments at remote data centers and edge servers in the latter scenario, declarative specification of table subsets detracts from the scalability of the entire system. To overcome such a limitation, a database cache of the present invention adapts to system load by automatically choosing data to cache, without requiring modification to the format of database queries. Distributed query execution, in which a query is executed at either a local database cache or a remote backend database server, is also provided.

In an alternative embodiment, two-headed query plans are used for checking the freshness of cache table contents at runtime. For this purpose, a probe query portion in a two-headed query plan further comprises conditions eliciting a comparison of the latency of cache table data with a desired freshness value, at the time a query is executed. If a desired freshness constraint is not satisfied, remote query portion of a two-headed plan is executed.

Additionally, the present invention provides for an article of manufacture comprising computer readable program code contained within implementing one or more modules to maintain an adaptive database cache consistent with a corresponding remote backend database. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Generally implemented in computer program code based products are software modules for: (a) populating an instance of an adaptive database cache consistent with a corresponding remote backend database; (b) generating a query plan utilizing locally cached database tables; (c) performing on-demand loading of local cache tables; and (d) operating on a local database cache to maintain consistency with respect to changes occurring a remote backend database. More specific embodiments (as disclosed herein), variations, and functional equivalents are deemed within the scope of the present invention.

CONCLUSION

A system and method has been shown in the above embodiments for the effective implementation of a system and method for adaptive database caching. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program or computing environment.

Appendix A

Formally, a query Q has $T_1, T_2, \ldots, T_n$ subset of tables used in Q that have corresponding cache tables $CT_1, CT_2, \ldots, CT_n$. $P_1, P_2 \ldots P_m$ denote equality predicates in Q. Initially, sets $T_{local}$, and $P_{local}$ are empty. $T_{local}$ represents an eligibility set. Every $CT_i$ and $P_k$ can be used in a probe query if and only if there is an equality predicate, $P_k$ of the form "$T_i.c_x=value_i$", where $c_x$ is a domain-complete column of $CT_i$. In this case, sets are updated as $T_{local}=T_i \, 4 \, T_{local}$, and $P_{local}=P_k \, 4 \, P_{local}$.

After all the equality predicates in Q have been processed, the condition of the probe query becomes:

$EXISTS(PQ_1) \ldots EXISTS(PQ_s)$, where $s=|T_{local}|$
and each $PQ_i$ is a subquery created as:
SELECT 1
FROM $CT_i$
WHERE $CT_i.c_x = value_i$ (where "$T_i.c_x = value_i$" $\chi \, P_{local}$)

After the dynamic cache tables for the probe query are determined, the following checks are done for join predicates to find out whether any other dynamic cache table $CT_j$ can take part in the local query:

For every equi-join predicate $P_k$ of the form "$T_i.c_x=T_j.c_y$", if $T_i \chi T_{local}$ and $CT_i$ is a cache-parent of $CT_j$ in an RCC through the columns $CT_i.c_x$ and $CT_j.c_y$, then update the set $T_{local}=T_j \, 4 \, T_{local}$.

For every equi-outer-join predicate $P_k$ of the form "$T_i.c_x$ (outer)$=T_j.c_y$", if $T_i \chi T_{local}$ and $CT_i$ is a cache-parent of $CT_j$ in an RCC through the columns $CT_i.c_x$ and $CT_j.c_y$, then update the set $T_{local}=T_j \, 4 \, T_{local}$.

These steps are repeated until no more dynamic cache tables can be added to $T_{local}$. Finally, each table $T_i \chi T_{local}$ is replaced with its respective dynamic cache table $CT_i$ in the local query plan.

The invention claimed is:

1. A method for maintaining a consistent, local instance of a remote database management system (DBMS), said method comprising:
   a. creating a local cache database of at least one table caching dynamically changing subsets of data of said at least one table in a remote backend database;
   b. executing against said local cache database, a query issued against said remote backend database;
   c. asynchronously populating said at least one table of said local cache database based on outcome of said execution step; and
   d. asynchronously updating content of said at least one table in said local cache database with respect to changes to said at least one table in said remote backend database.

2. The method of claim 1, wherein said at least one table in local cache database is semantically equivalent to said at least one table in remote DBMS.

3. The method of claim 1, wherein, when outcome of said execution of query indicates a cache miss, said method further comprises the step of asynchronously populating at least one table in said local cache database.

4. The method of claim 1, wherein consistency of said local cache database, with respect to said dynamically changing subsets of data, is determined by a set comprised of: cache keys and referential cache constraints.

5. The method of claim 4, wherein said referential cache constraint is based on a pair of columns, each of said columns from a distinct cache table; each of said distinct cache tables having correlated value pairs from said pair of columns; each of said distinct cache tables satisfying conditions necessary to allow a join operation to be executed between said columns in pair.

6. The method of claim 4, wherein said cache key constraint is based on a cache key column from a table from said local cache database; said cache key column maintained as domain complete; said table from said local cache database populated with missing cache key column values determined based on said cache key column.

7. The method of claim 6, wherein, when the same rows in said table in said remote backend database exist in said table in local cache database for a given value for said column, said method further comprising the steps of: maintaining a domain complete property for said column of said table in local cache database; and satisfying the condition to execute an equality predicate for said column in said local cache database.

8. The method of claim 4, wherein, when said distinct cache tables are populated based on said at least one cache key column of a root cache table, said method further comprising maintaining member tables of a common cache group for said distinct cache tables having a referential cache relationship.

9. The method of claim 8, wherein said population is performed by a cache maintenance component; said cache maintenance component provided as input, an outcome of said execution of query indicating a cache miss and said set of referential cache constraints.

10. The method of claim 9, wherein said cache maintenance component derives a set of rows from said outcome of execution step indicating said cache miss, and from said set of referential cache constraints.

11. The method of claim 4, wherein said cache maintenance component performs, based on derived set of rows from said cache constraints, cache maintenance functions comprising:
   a. upon an insertion occurring at said at least one table in said remote DBMS, copying said derived row data to said at least one table in said local cache database mirroring said at least one table in said remote DBMS;
   b. upon an deletion occurring at said at least one table in said remote DBMS, deleting said derived row data from said at least one table in said local cache database mirroring said at least one table in said remote DBMS; and
   c. upon a change occurring at said at least one table in said remote DBMS, changing said at least one table in said local cache database mirroring said at least one table in said remote DBMS with said derived row data.

12. The method of claim 4, wherein said cache maintenance component performs garbage collection functions compromising: generating and issuing statements derived from said cache constraints against said local cache database in deletion of rows from said at least one table of local cache database.

13. The method of claim 12, wherein said deletion is based on any of: statistics for said local cache database, a specified maximum size for said local cache database, and said set of referential cache constraints.

14. A method for determining, from a user input query, a Janus query plan for execution against a local cache database mirroring content of a remote DBMS and against said remote DBMS; said method comprising:
   a. generating a probe query portion for said Janus query plan based on equality predicates in said input query;
   b. creating a remote portion of said Janus query plan by substituting for, in said input query, a set of references indicating tables in said local DBMS, a set of references indicating tables in said remote database;
   c. creating a local portion of said Janus query plan by cloning a query plan for said user input query and substituting for a set of cloned references indicating tables in said remote DBMS, a set of references indicating tables in said local cache database; said creation based on results of determination of cache table availability; and
   d. associating said portions with said Janus query plan using a conditional switch operator.

15. The method of claim 14, wherein said tables indicated by said set of references to local cache database are semantically equivalent to said tables in remote DBMS indicated by said set of cloned references.

16. The method of claim 14, wherein said cache table availability determination is comprised of:
   a. creating a subset of tables from said set of tables in said local cache database eligible to provide results to said local portion of Janus query plan; said eligibility based on a set of cache constraints; and
   b. checking whether tables in said set of eligible tables contain row and column information necessary to provide results to said local portion of Janus query plan.

17. The method of claim 14, wherein said probe query result is used to select either of: said local portion or said remote portion of Janus query plan for execution; with said local portion of Janus query plan selected when tables in said set of eligible tables contain said necessary row and column values, and said remote portion of Janus query plan is selected, otherwise.

18. The method of claim 17, wherein, when said local portion of Janus query plan is selected, said local portion of Janus query plan is executed against said set of eligible tables, and, when said remote portion of Janus query plan is selected, said remote portion of Janus query plan is executed against said tables in remote DBMS.

19. The method of claim 18, wherein said determination is made during time of execution.

20. The method of claim 14, wherein said probe query portion for said Janus query plan can be generated to include predicates for determining freshness of said eligible tables used in said local portion of said Janus query plan based on refresh times of said eligible cache tables.

21. The method of claim 20, wherein said probe query result is used to select either of: said local portion or said remote portion of Janus query plan for execution; said local portion of Janus query plan selected when said set of eligible tables satisfy said necessary freshness values, and said remote portion of Janus query plan is selected, otherwise.

22. The method of claim 21, wherein, when said local portion of Janus query plan is selected, said local portion of Janus query plan is executed against said set of eligible tables, and, when said remote portion of Janus query plan is selected, said remote portion of Janus query plan is executed against said tables in remote DBMS.

23. The method of claim 22, wherein said determination is made during time of execution.

24. A computer-implemented readable storage medium which implements the maintenance of a consistent, local instance of a remote database management system (DBMS); said medium comprising: a. creating a local cache database of at least one table caching dynamically changing subsets of data of said at least one table in a remote backend database; b. executing against said local cache database, a query issued against said remote backend database; c. asynchronously populating said at least one table of said local cache database based on outcome of said execution step; and d. asynchronously updating content of said at least one table in said local cache database with respect to changes to said at least one table in said remote backend database.

25. A computer-implemented readable storage medium which implements a Janus query plan enabled to execute against a local cache database mirroring content of a remote DBMS and against said remote DBMS, from a user input query; said computer-implemented readable storage medium when executed by a computer, the computer causes said computer to: generate a probe query portion for said Janus query plan based on either of: equality predicates and refresh times of eligible cache tables in said query; determine cache table availability b accessing data at first subset of tables in said local cache database; said first subset chosen on the basis of equality predicates in said input query; a clone said input query to determine a remote portion of said Janus query plan; create a local portion of said Janus query plan by cloning said input query and change a set of cloned references indicating tables in said remote DBMS to a set of references indicating tables in said local cache database; said creation based on results of said cache table availability determination; and associate said portions with said Janus query plan using conditional switch operator.

* * * * *